(12) United States Patent
Kikkawa et al.

(10) Patent No.: US 10,781,752 B2
(45) Date of Patent: Sep. 22, 2020

(54) INLET AIR COOLING SYSTEM AND INLET AIR COOLING METHOD FOR GAS TURBINE

(71) Applicant: Chiyoda Corporation, Yokohama-shi, Kanagawa (JP)

(72) Inventors: Yoshitsugi Kikkawa, Yokohama (JP); Takashi Okano, Yokohama (JP); Satoshi Yasuda, Yokohama (JP); Toshiya Momose, Yokohama (JP); Masanori Kameta, Yokohama (JP)

(73) Assignee: CHIYODA CORPORATION, Yokohama-Shi, Kanagawa (JP)

( * ) Notice: Subject to any disclaimer, the term of this patent is extended or adjusted under 35 U.S.C. 154(b) by 84 days.

(21) Appl. No.: 16/081,194

(22) PCT Filed: Mar. 23, 2016

(86) PCT No.: PCT/JP2016/001699
§ 371 (c)(1),
(2) Date: Aug. 30, 2018

(87) PCT Pub. No.: WO2017/163275
PCT Pub. Date: Sep. 28, 2017

(65) Prior Publication Data
US 2019/0072036 A1    Mar. 7, 2019

(51) Int. Cl.
*F25B 27/00* (2006.01)
*F02C 7/143* (2006.01)
(Continued)

(52) U.S. Cl.
CPC ............ *F02C 7/143* (2013.01); *F01D 15/005* (2013.01); *F01D 15/08* (2013.01); *F01D 15/10* (2013.01);
(Continued)

(58) Field of Classification Search
CPC ... F25B 27/00; F25B 11/00; F02C 7/143; F02C 6/00; F01D 15/005; F01D 15/08;
(Continued)

(56) References Cited

U.S. PATENT DOCUMENTS 5,689,141 A     11/1997  Kikkawa et al.
6,442,942 B1 *  9/2002   Kopko .................. F02C 3/36
                                              60/726
(Continued)

FOREIGN PATENT DOCUMENTS

JP    8-219571 A     8/1996
JP    2007-512456 A  5/2007
(Continued)

OTHER PUBLICATIONS

International Search Report issued in PCT/JP2016/001699 dated Jun. 7, 2016.

*Primary Examiner* — Henry T Crenshaw
*Assistant Examiner* — Kamran Tavakoldavani
(74) *Attorney, Agent, or Firm* — Armstrong Teasdale LLP

(57) ABSTRACT

An inlet air cooling system used in a gas turbine for supplying power to a refrigerant compressor for compressing refrigerant in a natural gas liquefaction plant includes: an inlet air cooler for cooling inlet air of the gas turbine; chiller motors used for a chiller for cooling coolant supplied to the inlet air cooler; a first variable speed driver for supplying electric power to each of the one or more chiller motors; and an electric generator driven by the gas turbine, wherein the electric generator is electrically connected to the first variable speed driver, and electric power generated by the electric generator can be supplied to each of the chiller motors from the first variable speed driver without using a
(Continued)

main power line of an electric power system, which enables efficient electric power supply to the motors via the variable speed driver.

6 Claims, 7 Drawing Sheets

(51) Int. Cl.
    *F25J 1/00*         (2006.01)
    *F01D 15/00*      (2006.01)
    *F01D 15/08*      (2006.01)
    *F01D 15/10*      (2006.01)
    *F02C 6/00*        (2006.01)
    *F25J 1/02*        (2006.01)

(52) U.S. Cl.
    CPC ............... *F02C 6/00* (2013.01); *F25J 1/0052* (2013.01); *F25J 1/0283* (2013.01); *F25J 1/0287* (2013.01); *F25J 1/0022* (2013.01); *F25J 1/0055* (2013.01); *F25J 1/0087* (2013.01); *F25J 1/029* (2013.01); *F25J 1/0216* (2013.01); *F25J 1/0298* (2013.01)

(58) Field of Classification Search
    CPC ........ F01D 15/10; F25J 1/0052; F25J 1/0287; F25J 1/0283; F25J 1/0022; F25J 1/0055; F25J 1/0087; F25J 1/0216; F25J 1/029; F25J 1/0298
See application file for complete search history.

(56) References Cited

U.S. PATENT DOCUMENTS

| | | |
|---|---|---|
| 2006/0283206 A1 | 12/2006 | Rasmussen et al. |
| 2010/0019717 A1 | 1/2010 | Bjerknes et al. |
| 2012/0204587 A1 | 8/2012 | Zamir |
| 2012/0313372 A1 | 12/2012 | Bjerknes et al. |
| 2013/0119666 A1* | 5/2013 | Holt ....................... F25J 1/0244 290/52 |

FOREIGN PATENT DOCUMENTS

| | | |
|---|---|---|
| JP | 2010-503791 A | 2/2010 |
| JP | 2013-508663 A | 3/2013 |
| WO | 2008/047489 A1 | 4/2008 |
| WO | 2008/136121 A1 | 11/2008 |
| WO | 2008/139534 A1 | 11/2008 |
| WO | 2008/139527 A1 | 7/2010 |

* cited by examiner

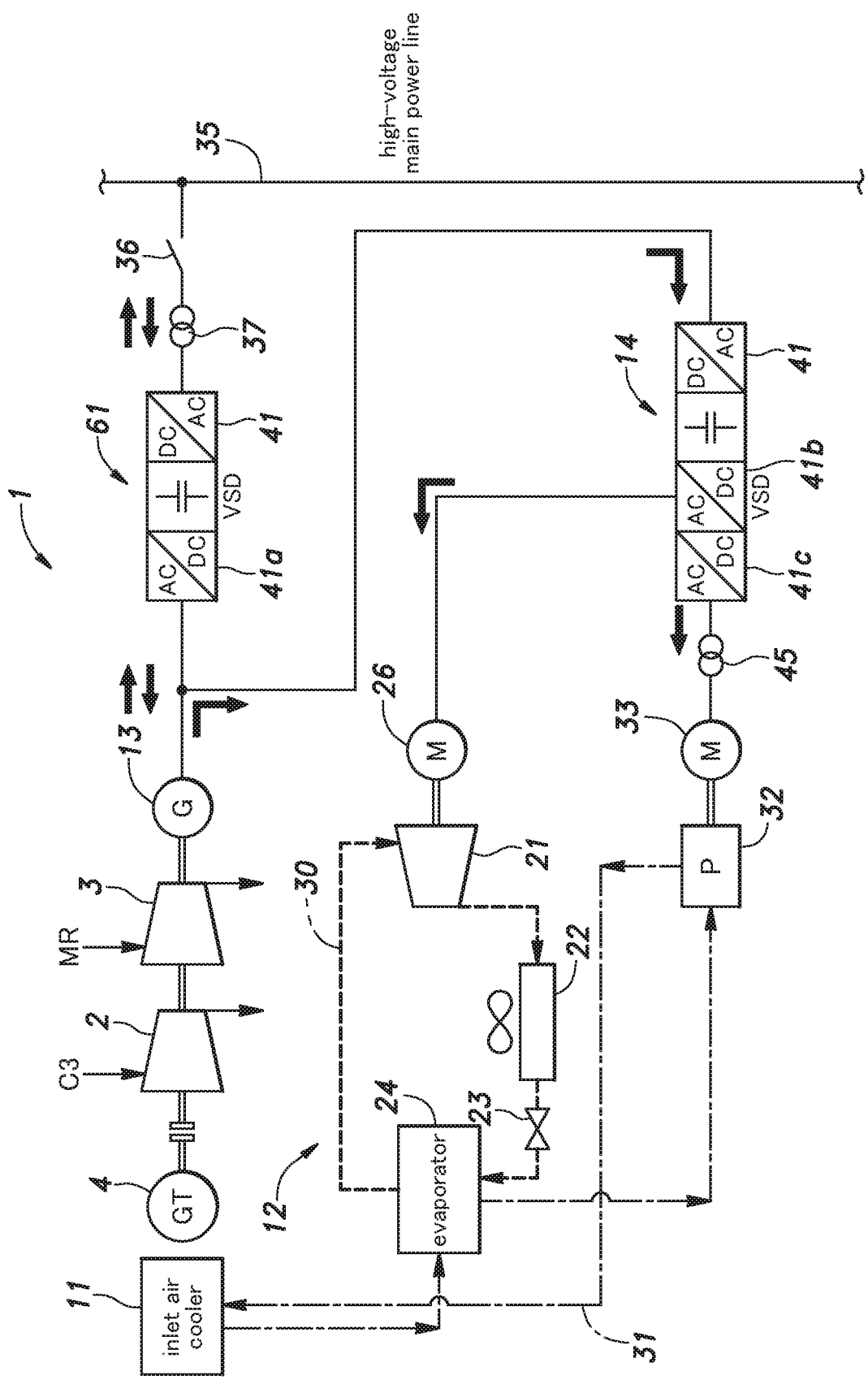

INLET AIR COOLING SYSTEM AND INLET AIR COOLING METHOD FOR GAS TURBINE

CROSS-REFERENCE TO RELATED APPLICATION

This application is a U.S. National Phase Application of PCT/JP2016/001699, filed on Mar. 23, 2016. This application is hereby expressly incorporated by reference in its entirety.

TECHNICAL FIELD

The present invention relates to an inlet air cooling system and method used in a gas turbine for supplying power to a refrigerant compressor for compressing refrigerant in a natural gas liquefaction plant.

BACKGROUND ART

In a natural gas liquefaction plant for purifying and liquefying natural gas taken from gas fields or other sources, required energy is derived from natural gas fuel, which is used as a main energy source, and supplied in the two forms; that is, heat energy and motive energy. The heat energy and the motive energy are mainly supplied by a boiler or furnace and by a gas turbine, respectively.

The motive energy is mainly used as drive power in a refrigerant compressor for compressing refrigerant used for cooling natural gas. In this type of natural gas liquefaction plant, natural gas (raw material gas) is cooled in multiple stages, in each of which gas is cooled to a corresponding temperature level, in order to reduce energy consumption of the drive power in the refrigerant compressor. For example, in a propane pre-cooled mixed refrigerant process (C3-MR process), propane is used to pre-cool raw material gas to about −30° C., first, and then a mixed refrigerant is used to cool the pre-cooled gas to very low temperatures (about −162° C.), achieving liquefaction. In this process, each refrigerant circulates in a closed loop to form an independent refrigeration cycle, which is provided with a dedicated gas turbine to drive a compressor.

Examples of known motive-power supplying facilities for a natural gas liquefaction plant include one provided with a gas turbine, an inlet air cooler for cooling inlet air of the gas turbine with coolant water supplied from a chiller, a refrigerant compressor driven by the gas turbine for compressing refrigerant, and an electric generator for generating electric power driven by the gas turbine. (See Patent Document 1)

PRIOR ART DOCUMENT (S)

Patent Document(S)

Patent Document 1: WO2008/139527A1

SUMMARY OF THE INVENTION

Task to be Accomplished by the Invention

In the prior art technology disclosed in Patent Document 1, the costs associated with the gas turbine for supplying motive-power to the refrigerant compressor and peripheral equipment of the gas turbine account for a higher proportion of the total cost including the total operation costs and facility costs of a natural gas liquefaction plant. Moreover, the facility may require, as peripheral equipment of the gas turbine, multiple motors such as a motor for starting the gas turbine, a motor for driving a chiller compressor for compressing the coolant water in the chiller, and a pump motor for driving a coolant water pump.

However, in the above-described prior art technology, when electric power is supplied to those motors from a main line of an electric power system via respective variable speed drives (VSD) in order to control the rotations of the motors, many variable speed drives are required, thereby leading to a problem of increased facility costs related to variable speed drives.

Furthermore, in cases where the above-described technology is used in an environment in which ambient temperature changes due to seasonal or diurnal and nocturnal fluctuations, changes in temperatures of inlet air of a gas turbine can lead to changes in motive power supply from a facility. In addition, changes in drive power requirements of refrigerant compressors and power consumptions of motors can cause changes in electric power supply to the facility via variable speed drivers.

The inlet air temperature may be adjusted within a certain range by an inlet air cooler of in the above-described prior art. However, the prior art technology does not involve any consideration of improvement in efficiency of electric power supply via variable speed drivers.

The present invention has been made in view of the aforementioned problems of the prior art, and a primary object of the present invention is to provide an inlet air cooling system and method which enables efficient electric power supply to one or more motors via variable speed drivers.

Means to Accomplish the Task

A first aspect of the present invention provides an inlet air cooling system (1) used in a gas turbine (4) for supplying power to a refrigerant compressor (2, 3) for compressing refrigerant in a natural gas liquefaction plant, comprising: an inlet air cooler (11) for cooling inlet air of the gas turbine; one or more chiller motors (26, 33, 51, 55) used for a chiller (12) for cooling coolant supplied to the inlet air cooler; a first variable speed driver (14) for supplying electric power to each of the one or more chiller motors; and an electric generator (13) driven by the gas turbine, wherein the electric generator is electrically connected to the first variable speed driver, and electric power generated by the electric generator is allowed to be supplied to each of the one or more chiller motors from the first variable speed driver without using a main power line (35) of an electric power system.

In the gas turbine inlet air cooling system according to the first aspect of the present invention, since electric power generated by the electric generator is allowed to be supplied to each of the one or more chiller motors from the first variable speed driver without using the main power line, electric power can be supplied to the motors via the variable speed drive in an efficient manner.

According to a second aspect of the present invention, in the gas turbine inlet air cooling system of the first aspect, the electric generator functions as a starter motor (13) for starting the gas turbine, and wherein the gas turbine inlet air cooling system further comprises a second variable speed driver (61) for supplying electric power from the main power line to the electric generator which functions as the starter motor.

In the gas turbine inlet air cooling system according to the second aspect of the present invention, even when a gas turbine used in the system requires a starter motor, electric power can be supplied from the main power line of the electric power system to the starter motor at the time of starting the gas turbine, and, after the gas turbine has been started, electric power generated by the electric generator is allowed to be supplied to each of the one or more chiller motors from the first variable speed driver without using the main power line.

According to a third aspect of the present invention, in the gas turbine inlet air cooling system of the second aspect, at least part of the electric power generated by the electric generator is supplied from the second variable speed driver to the main power line.

In the gas turbine inlet air cooling system according to the third aspect of the present invention, even when electric power generated by the electric generator becomes excessive with respect to the electric power required for the chiller compressor motor, surplus electric power is supplied to the high-voltage main power line via the second variable speed driver, whereby the surplus electric power can be effectively utilized in other facilities.

According to a fourth aspect of the present invention, in the gas turbine inlet air cooling system of the first aspect, at least part of the electric power generated by the electric generator is supplied from the first variable speed driver to the main power line.

In the gas turbine inlet air cooling system according to the fourth aspect of the present invention, even when electric power generated by the electric generator becomes excessive with respect to the electric power required for the chiller compressor motor, surplus electric power is supplied to the high-voltage main power line via the first variable speed driver, whereby, with this simple configuration, the surplus electric power can be effectively utilized in other facilities.

According to a fifth aspect of the present invention, in the gas turbine inlet air cooling system of any one of the first to fourth aspects, the chiller motor comprises at least one selected from the group consisting of a chiller compressor motor (26) for driving a chiller compressor (21) used in the chiller; a first pump motor (33) for driving a first pump for moving the coolant cooled by the chiller to the inlet air cooler; and a second pump motor (55) for driving a second pump (54) for moving heating medium to a cooling tower (52), wherein heat exchange is performed between the heating medium and the coolant in a condenser (22) used in the chiller.

In the gas turbine inlet air cooling system according to the fifth aspect of the present invention, since electric power generated by the electric generator is allowed to be supplied to the main motors, which are used as peripheral equipment of the gas turbine, from the first variable speed driver without using the main power line, electric power can be supplied to the motors via the variable speed drive in an efficient manner.

According to a sixth aspect of the present invention, in the gas turbine inlet air cooling system of any one of the first to fifth aspects, the refrigerant compressor includes a propane compressor (2) and a mixed refrigerant compressor (3) for compressing propane refrigerant and a mixed refrigerant, respectively, for a C3-MR process used in the natural gas liquefaction plant.

In the gas turbine inlet air cooling system according to the sixth aspect of the present invention, in order to cool inlet air of the gas turbine for supplying power to the propane compressor and the mixed refrigerant compressor for the C3-MR process used in the natural gas liquefaction plant, electric power can be supplied to the motors via the variable speed drive in an efficient manner.

A seventh aspect of the present invention provides an inlet air cooling method used in a gas turbine for supplying power to a refrigerant compressor for compressing refrigerant in a natural gas liquefaction plant, comprising: an inlet air cooling step for cooling inlet air of the gas turbine; a chilling step for cooling coolant used in the inlet air cooling step by a refrigeration cycle; and a generating step for driving an electric generator by the gas turbine to generate electric power; and an electric power supplying step in which electric power generated by the electric generator is supplied to one or more motors used in the chilling step from a first variable speed driver without using a main power line of an electric power system.

In the gas turbine inlet air cooling method according to the seventh aspect of the present invention, since electric power generated by the electric generator is allowed to be supplied to each of the motors from the variable speed driver without using the main power line, electric power can be supplied to the motors via the variable speed drive in an efficient manner.

Effect of the Invention

The present invention enables efficient electric power supply to one or more motors via one or more variable speed drivers in an inlet air cooling system which is used in a gas turbine for supplying power to a refrigerant compressor for compressing refrigerant in a natural gas liquefaction plant.

BRIEF DESCRIPTION OF THE DRAWINGS

FIG. 7 is a schematic configuration diagram of a gas turbine inlet air cooling system according to a modification of the third embodiment of the present invention;

DESCRIPTION OF THE PREFERRED EMBODIMENT(S)

Embodiments of the present invention are described in the following with reference to the appended drawings.

First Embodiment

Figure 1:
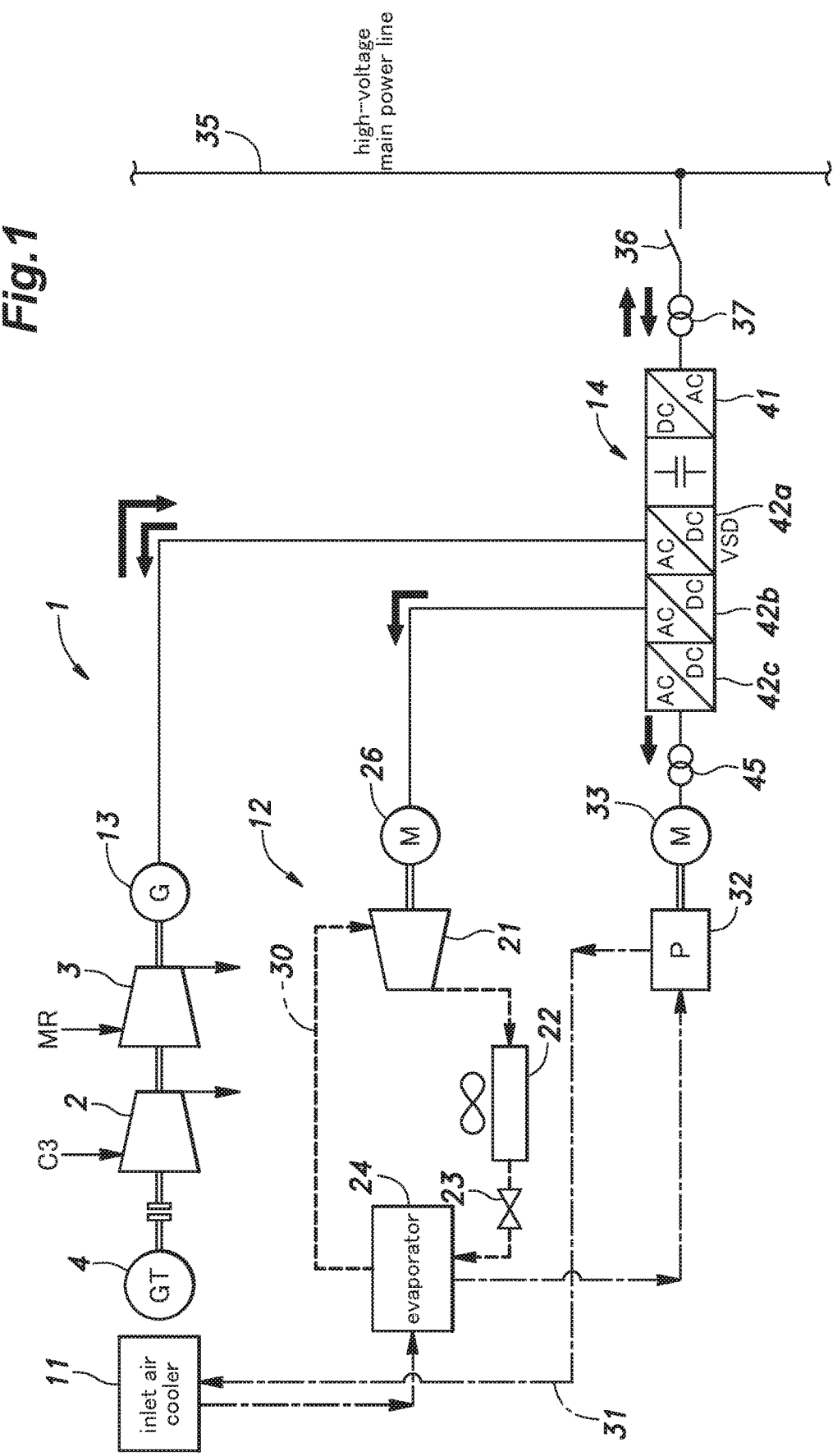
FIG. 1 is a schematic configuration diagram of a gas turbine inlet air cooling system according to a first embodiment of the present invention.

FIG. 1 is a schematic configuration diagram of a gas turbine inlet air cooling system 1 according to a first embodiment of the present invention. The gas turbine inlet air cooling system (hereinafter also referred to as "inlet air cooling system") 1 is peripheral equipment of a gas turbine 4 for supplying power to refrigerant compressors 2, 3 for compressing refrigerant in a natural gas liquefaction plant. In the natural gas liquefaction plant, a process for liquefying raw material gas (natural gas taken from gas fields or other sources) involves removing, from the raw material gas, impurities such as moisture, acidic gas components and mercury contained therein, and heavy components (benzene, pentane or heavier hydrocarbons) having a relatively high freezing point, and further involves cooling the raw material gas to about −162° C. by heat exchange with a refrigerant or the like to thereby liquefy the raw material gas; that is, to thereby produce LNG (liquefied natural gas).

Although not shown in detail, the natural gas liquefaction plant has a known configuration and includes, for example, a cooler for cooling raw material gas from which impurities have been removed, an expander for expanding the raw material gas which has been cooled by the cooler, a distillation column for distilling the raw material gas which has been decompressed by the expander at a pressure not more than a critical pressure of methane and heavy components, a compressor for compressing distilled gas provided from the distillation column, and a main heat exchanger for liquefying the distilled gas by heat exchange with a refrigerant.

Many techniques for cooling (liquefying) natural gas in a natural gas liquefaction plant have been developed such as techniques utilizing heat exchange with a refrigerant having a low boiling point (e.g. light hydrocarbon such as methane, ethane and propane etc.). However, in the present embodiment, a C3-MR process is utilized. In the C3-MR process, propane refrigerant and a mixed refrigerant are used. As shown in FIG. 1, the refrigerant compressor 2 (propane refrigerant compressor) forms a known refrigeration cycle for propane refrigerant (C3) in the natural gas liquefaction plant, and the refrigerant compressor 3 (mixed refrigerant compressor) forms another known refrigeration cycle for a mixed refrigerant (MR) in the natural gas liquefaction plant. The mixed refrigerant may be, but are not limited to, hydrocarbon mixtures containing methane, and ethane and propane plus nitrogen. Alternatively, the mixed refrigerant may be any refrigerant including other known components as long as it has desired properties for cooling.

The gas turbine 4 is a known single-shaft gas turbine using LNG as a fuel and is provided with a compressor, a combustor, a turbine and other components (all these elements are not shown), where the compressors and turbines are mechanically coupled to an output shaft. The gas turbine 4 according to the first embodiment of the present invention is not limited to a single-shaft gas turbine. Alternatively, the gas turbine 4 may be a known two-shaft gas turbine, which includes an output turbine for providing power output and a compressor drive turbine for driving a compressor which is provided separately from the output turbine, where the output turbine is not mechanically coupled to an output shaft of the compressor.

The inlet air cooling system 1 primarily includes an inlet air cooler 11 mounted to the gas turbine 4 for cooling inlet air thereof, a chiller 12 for cooling coolant (water, ethylene glycol-water mixture, or the like) supplied to the inlet air cooler 11, an electric generator 13 driven by the gas turbine 4, a variable speed driver (first variable speed driver) 14 for supplying electric power to main motors in the inlet air cooling system 1.

The inlet air cooler 11 is a known chiller-type cooling apparatus arranged at an inlet of the gas turbine 4. By using the coolant supplied to a cooling coil disposed within the inlet air cooler 11, the inlet air cooler 11 can cool the air (atmospheric air) introduced into the gas turbine 4 from the inlet to temperatures within a desired temperature range, thereby suppressing a decrease in power output of the gas turbine 4 caused due to an increase in the inlet air temperature (ambient temperature).

The chiller 12 primarily includes a chiller compressor 21, a condenser 22, an expansion valve 23, and an evaporator 24, and cools the coolant supplied to the inlet air cooler 11 by a known refrigeration cycle. The chiller compressor 21 is driven by a chiller compressor motor 26 and compresses heating medium circulating through a circulation line 30. The compressed heating medium is supplied, via the condenser 22 and the expansion valve 23, to the evaporator 24, where it exchanges heat with the coolant flowing through a circulation line 31 provided between the evaporator 24 and the inlet air cooler 11. In the circulation line 31, a cooling fluid pump (first pump) 32 is provided for circulating the coolant such that the coolant water cooled by the evaporator 24 is moved to the inlet air cooler 11. The cooling fluid pump 32 is driven by a pump motor (first pump motor) 33.

The electric generator 13 is mechanically coupled to an output shaft of the gas turbine 4 via a speed reducer (not shown) or other reduction means. The electric generator 13 generates electric power by using a surplus power output of the gas turbine 4 other than the power output supplied to the refrigerant compressors 2 and 3, and when the power output of the gas turbine 4 supplied to the refrigerant compressors 2 and 3 is insufficient, the electric generator 13 functions as a synchronous motor for driving (or assisting driving) the refrigerant compressors 2 and 3. In addition, the electric generator 13 can function as a synchronous motor (starter motor) used for starting the gas turbine 4. In the following description, when functioning as a synchronous motor, the electric generator 13 is indicated as "the gas turbine starting motor 13". Electric power from a high-voltage main power line 35 (commercial AC power) is supplied to the gas turbine starting motor 13 via the variable speed driver 14.

Examples of the heating medium used in the chiller 12 include R-717 (ammonia), R-290 (propane), R-134a (hydrofluorocarbon) and like heating medium. The chiller compressor motor 26 may be any known synchronous motor or known induction motor. The pump motor 33 may be any known induction motor.

The variable speed driver 14 is electrically connected to the gas turbine starting motor 13, the chiller compressor motor 26, and the pump motor 33, respectively, so that the variable speed driver 14 can perform variable speed control for each of the motors. Moreover, the variable speed driver 14 is connected to the high-voltage main power line 35 of the electric power system via a circuit breaker 36 and a transformer 37, and includes a convertor section 41 for converting AC electric power to DC electric power and multiple inverter sections 42a, 42b, 42c for converting DC electric power from the convertor section 41 to AC electric power with a prescribed frequency and voltage. The inverter sections 42a, 42b, 42c are connected in parallel to a common DC bus. The inverter section 42a is electrically connected to the electric generator 13, the inverter section 42b is electrically connected to the chiller compressor motor 26, and the inverter section 42c is electrically connected to the pump motor 33 via a transformer 45.

Table 1 shows the results of example simulations relating to the inlet air cooling system 1 of the first embodiment of the present invention. The simulation results include the required powers for the refrigerant compressors 2 and 3, the power outputs of the gas turbine 4, the electric power outputs of the electric generator 13, the electric power consumptions of the chiller compressor motor 26 (for the chiller compressor 21), the electric power consumptions of the coolant pump motor 33 (for the cooling fluid pump 32), and the surplus electric powers supplied to the high-voltage main power line 35 for different ambient temperatures of 20° C., 30° C., and 40° C. In Table 1, it is assumed that LNG production (the ratio of an amount of production to the maximum production capacity) in the natural gas liquefaction plant at each ambient temperature is 100%. It should be noted that the values for each ambient temperature do not strictly correspond to those for an actual inlet air temperature of the gas turbine 4 and are shown to facilitate understanding of how the atmospheric temperature influences on the respective items. (The same applies to Tables 2 to 5.)

TABLE 1

| | | | |
|---|---|---|---|
| LNG production | 100% | 100% | 100% |
| Ambient temperature (° C.) | 20 | 30 | 40 |
| Required power for the refrigerant compressors (kW) | 79,889 | 87,750 | 95,611 |
| Power output of the gas turbine (kW) | 100,696 | 97,771 | 94,847 |
| Electric power output of the electric generator (kW) | 20,807 | 10,021 | −765 |
| Electric power consumption of the chiller compressor motor (kW) | 1,961 | 3,348 | 6,753 |
| Electric power consumption of the coolant pump motor (kW) | 56 | 82 | 107 |
| Surplus electric power supplied to the high-voltage main power line (kW) | 18,790 | 6,591 | −7,625 |

When the ambient temperature is 20° C., the power output (100,696 kW) of the gas turbine 4 is greater than the required power (79,889 kW) for the refrigerant compressors 2, 3, and thus the difference (that is, the surplus of the power output of the gas turbine 4) is the electric power output (20,807 kW) of the electric generator 13. The electric power generated by the electric generator 13 is supplied to the chiller compressor motor 26 and the cooling fluid pump 32 via the variable speed driver 14. In this case, since the electric power output (20, 807 kW) of the electric generator 13 is greater than the sum of the electric power (1,961 kW) of the chiller compressor motor 26 and the electric power consumption (56 kW) of the pump motor 33, the surplus electric power (18,790 kW) is supplied to the high-voltage main power line 35.

When the ambient temperature is 30° C., the required power (87,750 kW) for the refrigerant compressor 2, 3 increases and the power output of the gas turbine 4 (97,771 kW) decreases as compared to the case of 20° C. However, there is still a surplus of the power output of the gas turbine 4, and power generation (10,021 kW) by the electric generator 13 is possible. The electric power consumption (3,348 kW) of the chiller compressor motor 26 and the electric power consumption (82 kW) of the coolant pump motor 33 are increased as compared to the case of 20° C. However, a surplus of the power output (6,591 kW) is still supplied to the high-voltage main power line 35.

When the ambient temperature is 40° C., the required power (95, 611 kW) for the refrigerant compressors 2, 3 further increases as compared to the case of 30° C., and the power output (94,847 kW) of the gas turbine 4 further decreases as compared to the case of 30° C. As a result, the power output of the gas turbine 4 becomes insufficient, and the refrigerant compressors 2, 3 are driven by the gas turbine starting motor 13. A negative value (−765 kW) of the electric power output of the electric generator 13 indicates that electric power is supplied from the high-voltage main power line 35 to the gas turbine starting motor 13. The electric power consumption (6,573 kW) of the chiller compressor motor 26 and the electric power consumption (107 kW) of the coolant pump motor 33 are increased as compared to the case of 20° C. However, since it becomes difficult to supply electric power from the electric generator 13, electric power (7, 625 kW) from the high-voltage main power line 35 is supplied to the motors via the variable speed driver 14. In Table 1, a negative value (−7, 625 kW) in the row of surplus electric power supplied to the high-voltage main power line 35 indicates that electric power is supplied to the motors from the high-voltage main power line 35.

As described above, in the inlet air cooling system 1, electric power generated by the electric generator 13 can be supplied to the chiller compressor motor 26 and the pump motor 33 directly connected to the variable speed driver 14 without using the high-voltage main power line 35, which enables efficient electric power supply to the motors via the variable speed drive. Furthermore, in the inlet air cooling system 1, even when electric power output generated by the electric generator becomes excessive with respect to the sum of the electric power consumption of the chiller compressor motor 26 (chiller compressor 21) and the pump motor 33 (cooling fluid pump 32), a surplus electric power is supplied to the high-voltage main power line 35 via the variable speed driver 14, whereby, with this simple configuration, the surplus electric power can be effectively utilized in other facilities.

Comparative Embodiment

Figure 2:
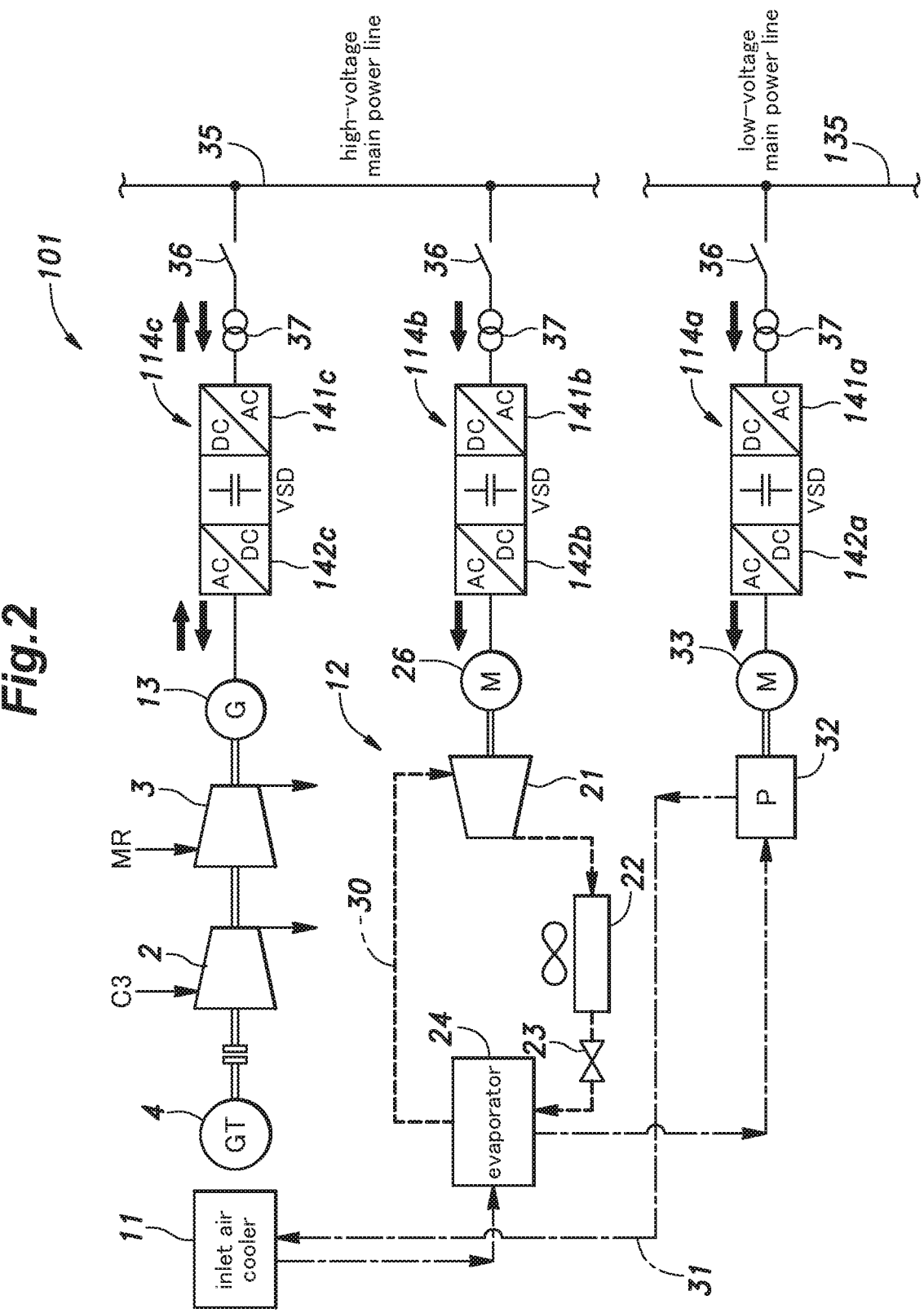
FIG. 2 is a schematic configuration diagram of a gas turbine inlet air cooling system according to a comparative embodiment to be compared with the first embodiment of the present invention.

FIG. 2 is a schematic configuration diagram of a gas turbine inlet air cooling system 101 according to a comparative embodiment to be compared with the first embodiment of the present invention. In the inlet air cooling system 101 shown in FIG. 2, repeat use of reference numerals is intended to represent the same or analogous features or elements illustrated in FIG. 1 (the first embodiment).

The inlet air cooling system 101 of the comparative embodiment is different from the inlet air cooling system 1 of the first embodiment in that the inlet air cooling system 101 includes multiple variable speed drivers 114a to 114c for supplying electric power independently to the main motors 13, 26, 33, which motors are the same as those in the inlet air cooling system 1.

More specifically, the inlet air cooling system 101 includes the variable speed driver 114a for supplying electric power from a low-voltage main power line 135 to the pump motor 33, the variable speed driver 114b for supplying electric power from the high-voltage main power line 35 to the chiller compressor motor 26, and the variable speed driver 114c for supplying electric power from the high-voltage main power line 35 to the gas turbine starting motor 13. When the gas turbine starting motor 13 functions as the electric generator 13, the generated electric power is supplied to the high-voltage main power line 35 via the variable speed driver 114c. The variable speed drivers 114a to 114c include respective convertor sections 141a to 141c each for converting AC electric power to DC electric power and respective inverter sections 142a to 142c each for converting DC electric power from the convertor sections 141a to 141c to AC electric power with a prescribed frequency and voltage.

Table 1 shows the results of example simulations relating to the inlet air cooling system 101 of the comparative embodiment. The simulation results include the required powers for the refrigerant compressors 2 and 3, the power outputs of the gas turbine 4, the electric power outputs of the electric generator 13 to the high-voltage main power line 35, the electric power inputs to the chiller compressor motor 26 (chiller compressor 21) from the high-voltage main power line 35, and electric power inputs to the coolant pump motor 33 (for the cooling fluid pump 32) from the high-voltage main power line 35 for different ambient temperatures of 20° C., 30° C., and 40° C.

TABLE 2

| | | | |
|---|---|---|---|
| LNG production | 100% | 100% | 100% |
| Ambient temperature (° C.) | 20 | 30 | 40 |
| Required power for the refrigerant compressors (kW) | 79,889 | 87,750 | 95,611 |
| Power output of the gas turbine (kW) | 100,696 | 97,771 | 94,847 |
| Electric power output of the electric generator to the high-voltage main power line (kW) | 12,818 | 1,246 | −10,326 |
| Electric power input to the chiller compressor motor from the high-voltage main power line (kW) | 1,961 | 3,348 | 6,753 |
| Electric power input to the coolant pump motor from the high-voltage main power line (kW) | 56 | 82 | 107 |

When the ambient temperature is 20° C., since there is a surplus of the power output of the gas turbine 4, the electric generator 13 generates electric power, and this electric power (12,818 kW) generated by the electric generator 13 is supplied to the high-voltage main power line 35. The electric power consumption (1,961 kW) of the chiller compressor motor 26 and the electric power consumption (56 kW) of the pump motor 33 are supplied from the high-voltage main power line 35 and the low-voltage main power line 135. (The same applies to the case of 30° C.)

When the ambient temperature is 40° C., since the power output of the gas turbine 4 becomes insufficient, the refrigerant compressors 2, 3 are driven by the gas turbine starting motor 13. A negative value (−10,326 kW) of the electric power output of the electric generator 13 to the high-voltage main power line 35 indicates that electric power is supplied from the high-voltage main power line 35 to the gas turbine starting motor 13.

Compared to the gas turbine inlet air cooling system 101 of the comparative embodiments, the inlet air cooling system 1 of the first embodiment described above provides an advantageously simpler configuration in which electric power is supplied to the main motors via the single variable speed driver 14. Moreover, in the inlet air cooling system 1 of the first embodiment, even when a surplus power occurs in the power output of the gas turbine 4, the surplus electric power can be supplied to the high-voltage main power line 35 via the single variable speed driver 14. Additionally, in the inlet air cooling system 1 of the first embodiment, electric power generated by the electric generator 13 can be supplied to the chiller compressor 21 (the chiller compressor motor 26) and the cooling fluid pump 32 (the pump motor 33) via the variable speed driver 14 without using the high-voltage main power line 35, which enables electric power to be supplied to the motors 26, 33 in a more efficient manner.

First Modification of First Embodiment

Figure 3:
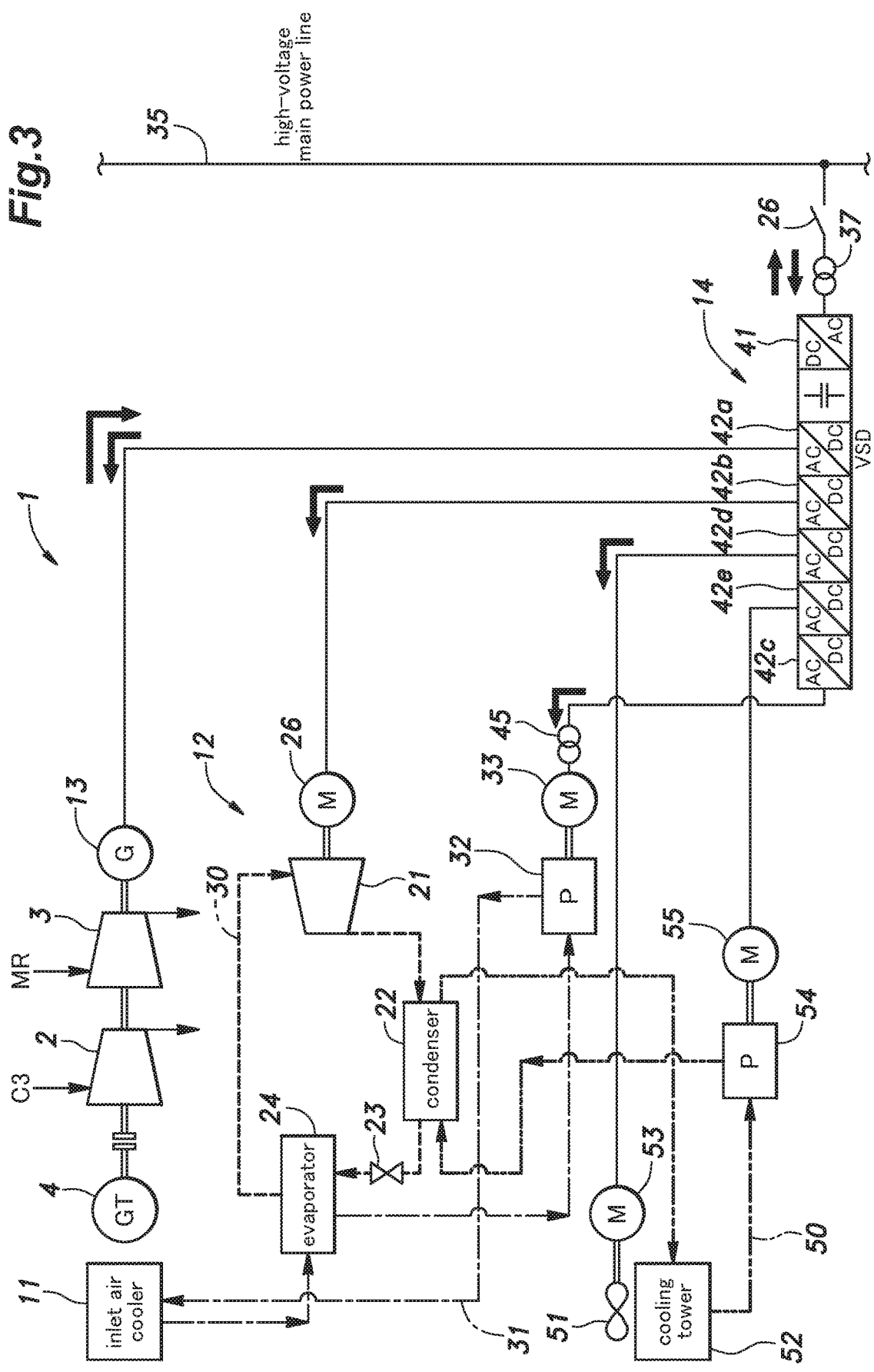
FIG. 3 is a schematic configuration diagram of a gas turbine inlet air cooling system according to a first modification of the first embodiment of the present invention.

FIG. 3 is a schematic configuration diagram of a gas turbine inlet air cooling system 1 according to a first modification of the first embodiment of the present invention. In the inlet air cooling system 1 shown in FIG. 3, repeat use of reference numerals is intended to represent the same or analogous features or elements illustrated in FIG. 1 (the first embodiment). Except for what will be described below, this first modification is the same as the first embodiment.

In the inlet air cooling system 1 of the first modification of the first embodiment, heat exchange is performed in the condenser 22 of the chiller 12 between the heating medium flowing through the circulation line 30 and coolant water flowing through a circulation line 50. Provided in the circulation line 50 is a cooling tower 52 equipped with a blower 51 for cooling the coolant water which has received heat from the heating medium in the condenser 22. The blower 51 is driven by a blower motor 53. A coolant water pump (second pump) 54 for circulating the coolant water is also provided in the circulation line 50. The coolant water cooled by cooling tower 52 is moved to the condenser 22 by the coolant water pump 54. The coolant water pump 54 is driven by a pump motor (second pump motor) 55.

A variable speed driver 14 includes multiple inverter sections 42a to 42e each for converting DC electric power from the convertor section 41 to AC electric power with a prescribed frequency and voltage. The inverter sections 42a to 42e are connected in parallel to a common DC bus. The inverter section 42d is electrically connected to the blower motor 53 and the inverter section 42c is electrically connected to the pump motor 55.

In the inlet air cooling system 1 of the first modification of the first embodiment, since there is a surplus of a power output of the gas turbine 4, the electric generator 13 generates electric power, which can be supplied via the variable speed driver 14 to the chiller compressor motor 26 (as a chiller motor), the pump motors 33, 55, and the blower motor 53, respectively. As shown in the first modification, the inlet air cooling system 1 of the first embodiment may be modified by changing the number and type of motors connected to the variable speed driver 14 (that is, to be motors to which electric power is supplied) as appropriate.

Second Modification of First Embodiment

Figure 4:
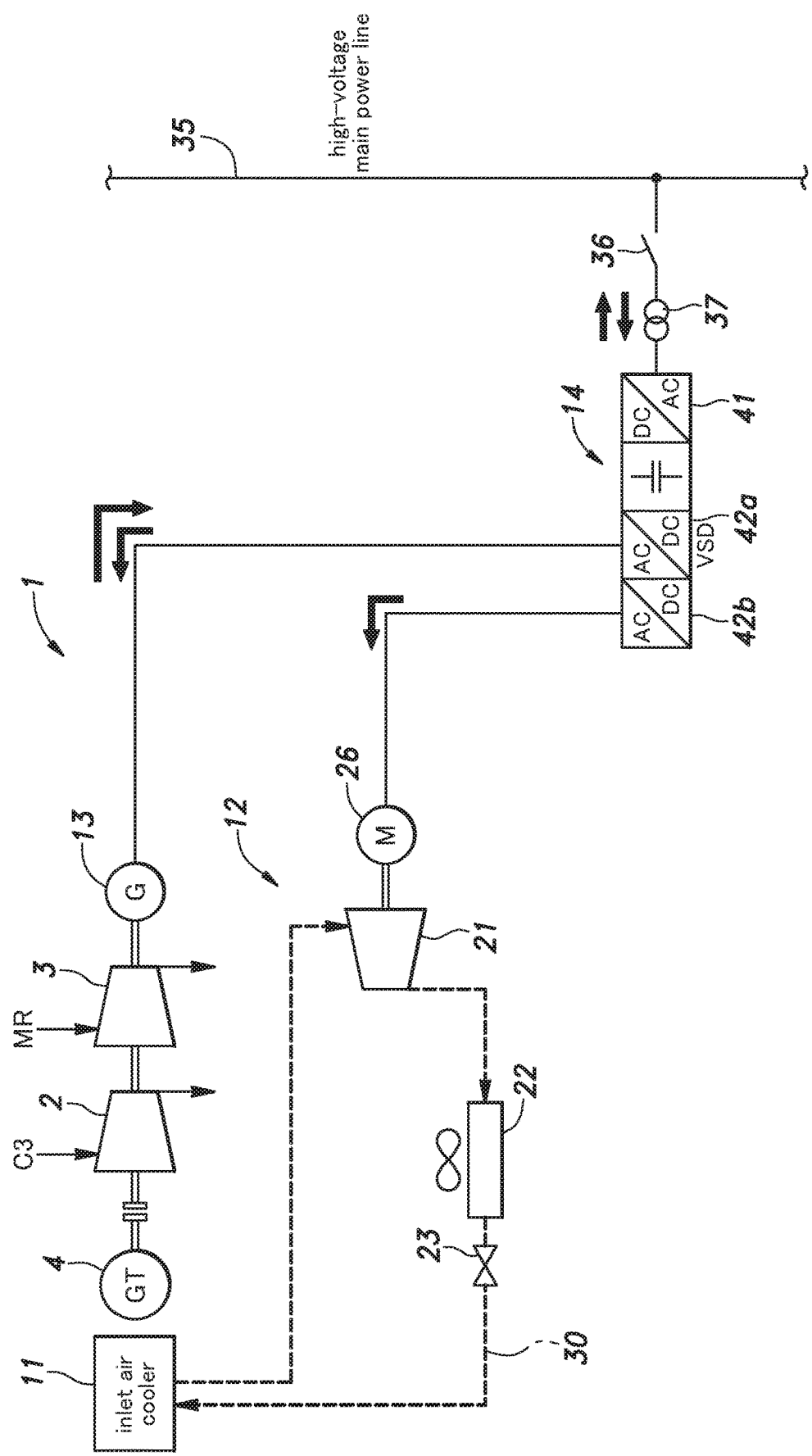
FIG. 4 is a schematic configuration diagram of a gas turbine inlet air cooling system according to a second modification of the first embodiment of the present invention.

FIG. 4 is a schematic configuration diagram of a gas turbine inlet air cooling system 1 according to a second modification of the first embodiment of the present invention. In the inlet air cooling system 1 shown in FIG. 4, repeat use of reference numerals is intended to represent the same or analogous features or elements illustrated in FIG. 1 (the first embodiment). Except for what will be described below, this second modification is the same as the first embodiment.

In the inlet air cooling system 1 of the second modification of the first embodiment, the circulation line 31 through which the coolant circulates in the first embodiment is removed (along with the cooling fluid pump 32, the pump motor 33), whereas the circulation line 31 through which the heating medium circulates in the first embodiment is modified such that the circulation line 31 further extends through the inlet air cooler 11. As a result, the inlet air cooler 11 functions as an evaporator of the refrigeration cycle. The heating medium flowing through the inlet air cooler 11 may be, for example, R-717 (ammonia).

Second Embodiment

Figure 5:
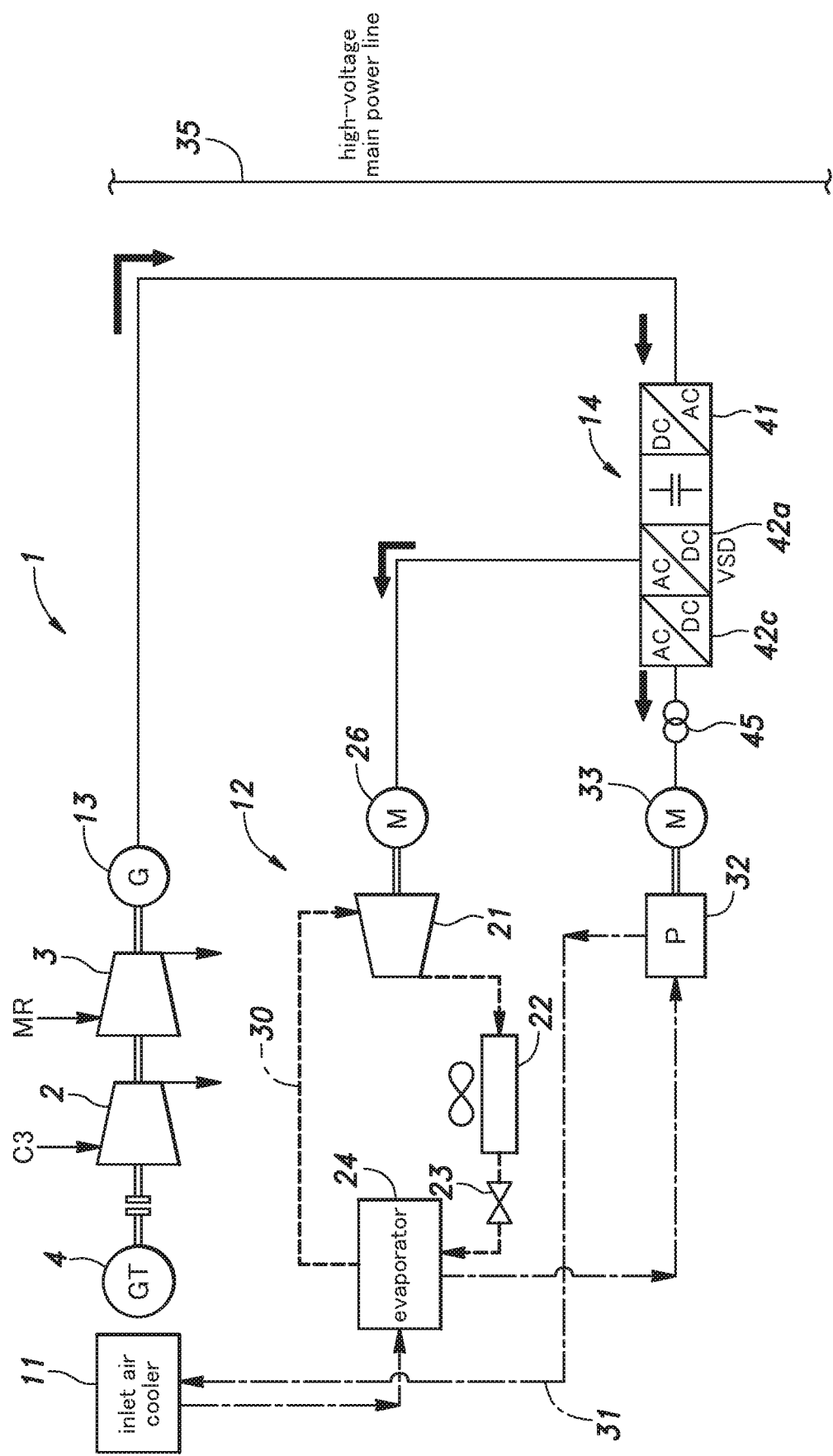
FIG. 5 is a schematic configuration diagram of a gas turbine inlet air cooling system according to a second embodiment of the present invention.

FIG. 5 is a schematic configuration diagram of a gas turbine inlet air cooling system 1 according to a second embodiment of the present invention. In the inlet air cooling system 1 shown in FIG. 5, repeat use of reference numerals is intended to represent the same or analogous features or elements illustrated in FIG. 1 (the first embodiment). Except for what will be described below, this second embodiment is the same as the first embodiment.

In the inlet air cooling system 1 of the second embodiment, a variable speed driver 14 is not connected to the high-voltage main power line 35 of the electric power system, and includes a convertor section 41 electrically connected to the electric generator 13 as well as the inverter sections 42b, 42c electrically connected to the chiller compressor motor 26 and the pump motor 33, respectively. As a result, the variable speed driver 14 can supply electric power from the electric generator 13 to the chiller compressor motor 26 and the pump motor 33. In this case, the gas turbine 4 is a known two-shaft gas turbine, and the electric generator 13 does not function as the gas turbine starting motor 13.

Table 3 shows the results of example simulations relating to the inlet air cooling system 1 of the second embodiment of the present invention. The simulation results include the required powers for the refrigerant compressors 2 and 3, the power outputs of the gas turbine 4, the electric power outputs of the electric generator 13, the electric power consumptions of the chiller compressor motor 26 (for the chiller compressor 21), the electric power consumptions of the coolant pump motor 33 (for the cooling fluid pump 32), and the surplus electric powers supplied to the high-voltage main power line 35 for different ambient temperatures of 20° C., 30° C., and 40° C.

TABLE 3

| | | | |
|---|---|---|---|
| LNG production | 100% | 100% | 92% |
| Ambient temperature (° C.) | 20 | 30 | 40 |
| Required power for the refrigerant compressors (kW) | 79,889 | 87,750 | 87,986 |
| Power output of the gas turbine (kW) | 81,905 | 91,180 | 94,846 |
| Electric power output of the electric generator (kW) | 2,017 | 3,430 | 6,860 |
| Electric power consumption of the chiller compressor motor (kW) | 1,961 | 3,348 | 6,753 |
| Electric power consumption of the coolant pump motor (kW) | 56 | 82 | 107 |
| Surplus electric power supplied to the high-voltage main power line (kW) | — | — | — |

In the inlet air cooling system 1 of the second embodiment, it is difficult to output electric power from the variable speed driver 14 to the high-voltage main power line 35. Thus, when the ambient temperature is 20 or 30° C., the output of the gas turbine 4 is lowered as compared to the first embodiment (Table 1) so as to produce the least possible surplus electric power generated by the electric generator 13 (that is, to balance the electric power output of electric generator 13 with the total electric power consumption of the chiller compressor motor 26 and the cooling fluid pump 32).

When the ambient temperature is 40° C., the power output of the gas turbine 4 is insufficient in the system of the first embodiment (Table 1). However, in the inlet air cooling system 1 of the second embodiment, LNG production in the natural gas liquefaction plant is suppressed (to 92%) so that the power output of the gas turbine 4 (94,846 kW) is greater than the required power (87,986 kW) for the refrigerant compressors 2, 3. This eliminates the need for electric power supply from the high-voltage main power line 35 as in the first embodiment (Table 1).

As described above, in the inlet air cooling system 1 in the second embodiment, electric power generated by the electric generator 13 can be supplied to each chiller motor directly from the variable speed driver 14 without connecting to the high-voltage main power line 35 (that is, without the need for commercial power source).

Third Embodiment

Figure 6:
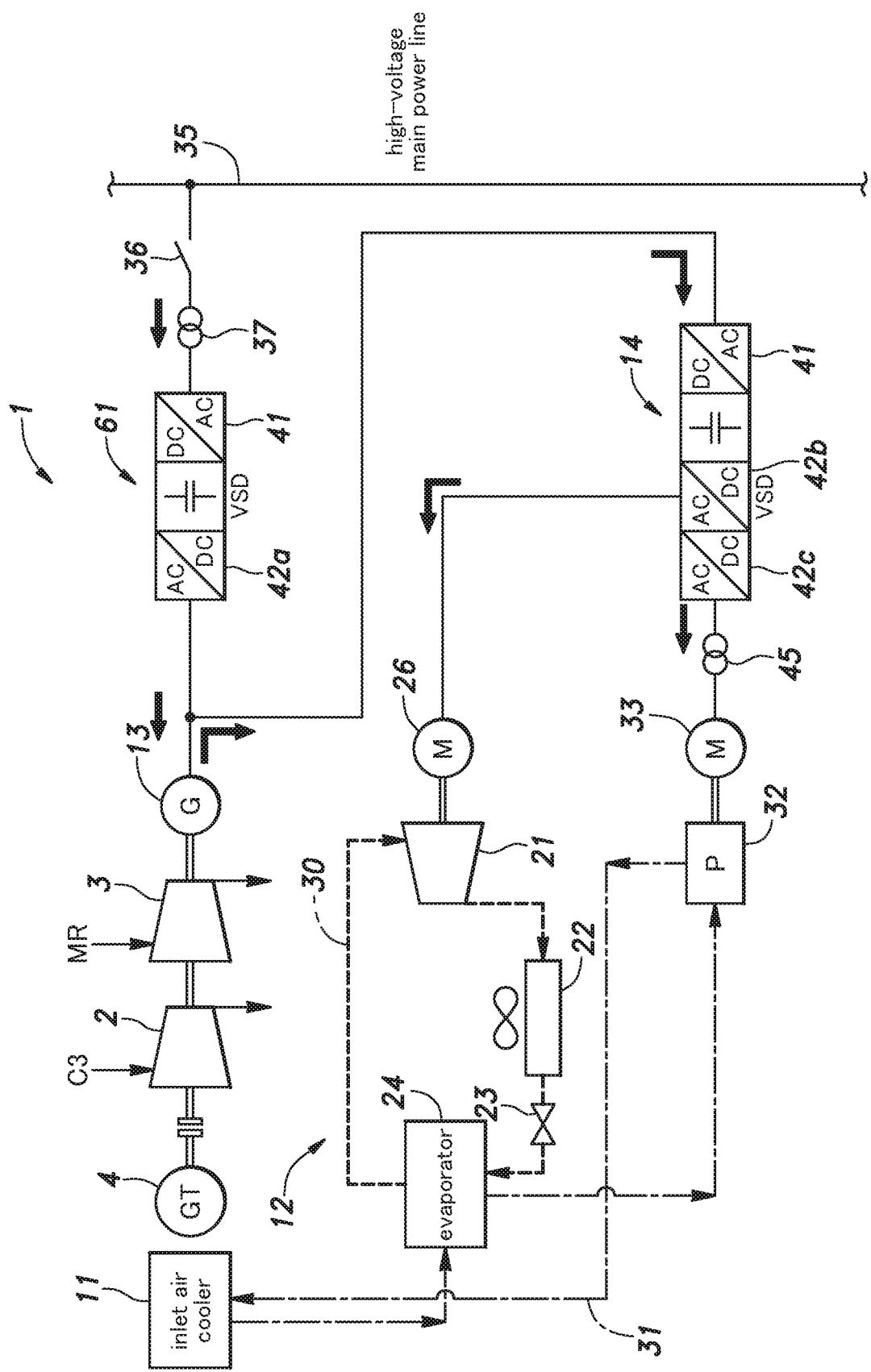
FIG. 6 is a schematic configuration diagram of a gas turbine inlet air cooling system according to a third embodiment of the present invention.

FIG. 6 is a schematic configuration diagram of a gas turbine inlet air cooling system 1 according to a third embodiment of the present invention. In the inlet air cooling system 1 shown in FIG. 6, repeat use of reference numerals is intended to represent the same or analogous features or elements illustrated in FIG. 5 (the second embodiment). Except for what will be described below, this second embodiment is the same as the first or second embodiment.

In the inlet air cooling system 1 of the third embodiment, another variable speed driver (second variable speed driver) 61 is provided. In addition, the third embodiment is different from the second embodiment in that the gas turbine 4 is a known single-shaft gas turbine.

The variable speed driver 61 includes a convertor section 41 connected to the high-voltage main power line 35 via a circuit breaker 36 and a transformer 37, and an inverter section 42a electrically connected to the electric generator 13. With this configuration, when the electric generator 13 functions as the gas turbine starting motor 13, the variable speed driver 61 can supply electric power from the high-voltage main power line 35 to the gas turbine starting motor 13.

Table 4 shows the results of example simulations relating to the inlet air cooling system 1 of the third embodiment of the present invention. The simulation results include the required powers for the refrigerant compressors 2 and 3, the power outputs of the gas turbine 4, the electric power outputs of the electric generator 13, the electric power consumptions of the chiller compressor motor 26 (for the chiller compressor 21), the electric power consumptions of the coolant pump motor 33 (for the cooling fluid pump 32), and the input electric powers from the high-voltage main power line 35 for different ambient temperatures of 20° C., 30° C., and 40° C.

TABLE 4

| | | | |
|---|---|---|---|
| LNG production | 100% | 100% | 92% |
| Ambient temperature (° C.) | 20 | 30 | 40 |
| Required power for the refrigerant compressors (kW) | 79,889 | 87,750 | 87,986 |
| Power output of the gas turbine (kW) | 81,905 | 91,180 | 94,846 |
| Electric power output of the electric generator (kW) | 2,017 | 3,430 | 6,860 |
| Electric power consumption of the chiller compressor motor (kW) | 1,961 | 3,348 | 6,753 |
| Electric power consumption of the coolant pump motor (kW) | 56 | 82 | 107 |
| Input electric power from the high-voltage main power line (kW) | 10,000 | 10,000 | 10,000 |

In Table 4, the items other than the "input electric power from high-voltage main power line" are the same as those in Table 3. As shown in Table 4, in the inlet air cooling system 1 of the third embodiment, it is possible to start the single-shaft gas turbine 4 by supplying input electric power (10,000 kW) from the high-voltage main power line 35 to the gas turbine starting motor 13 at the time of starting the gas turbine 4. In Table 4, LNG production in the natural gas liquefaction plant is suppressed (to 92%) when the ambient temperature is 40° C. as in Table 3. However, configurations are not limited to one in which LNG production was suppressed, and it is also possible to adopt configurations in which LNG production is 100% as in the cases of the other ambient temperatures.

Although, the number of the variable speed drivers in the inlet air cooling system 1 of the third embodiment is increased (two drivers: variable speed drivers 14 and variable speed drivers 61) compared to that of the first embodiment, it is still possible to supply electric power to the chiller motor 33 with fewer variable speed drivers than in the above-described comparative embodiment.

Modification of Third Embodiment

FIG. 7 is a schematic configuration diagram of a gas turbine inlet air cooling system 1 according to a modification of the third embodiment of the present invention. In the inlet air cooling system 1 shown in FIG. 7, repeat use of reference numerals is intended to represent the same or analogous features or elements illustrated in FIG. 6 (the third embodiment). Except for what will be described below, this modification is the same as the third embodiment.

The inlet air cooling system 1 of the modification of the third embodiment is different from that of the third embodiment in that the variable speed driver 61 is modified to be capable of supplying electric power generated by the electric generator 13 to the high-voltage main power line 35. In addition, the gas turbine 4 may be either a known single-shaft gas turbine or a known two-shaft gas turbine.

Table 5 shows the results of example simulations relating to the inlet air cooling system 1 of the modification of the third embodiment of the present invention. The simulation results include the required powers for the refrigerant compressors 2 and 3, the power outputs of the gas turbine 4, the electric power outputs of the electric generator 13, the electric power consumptions of the chiller compressor motor 26 (for the chiller compressor 21), the electric power consumptions of the coolant pump motor 33 (for the cooling fluid pump 32), and the surplus electric powers supplied to the high-voltage main power line 35 for different ambient temperatures of 20° C., 30° C., and 40° C.

TABLE 5

| | | | |
|---|---|---|---|
| LNG production | 100% | 100% | 100% |
| Ambient temperature (° C.) | 20 | 30 | 40 |
| Required power for the refrigerant compressors (kW) | 79,889 | 87,750 | 95,611 |
| Power output of the gas turbine (kW) | 100,696 | 97,771 | 94,847 |
| Electric power output of the electric generator (kW) | 20,807 | 10,021 | −765 |
| Electric power consumption of the chiller compressor motor (kW) | 1,961 | 3,348 | 6,753 |
| Electric power consumption of the coolant pump motor (kW) | 56 | 82 | 107 |
| Surplus electric power supplied to the high-voltage main power line (kW) | 18,790 | 6,591 | −7,625 |

In Table 5, values in the items are the same as those in Table 1 (the first embodiment). This means that, in the inlet air cooling system 1 of the modification of the third embodiment, although the number of the variable speed drivers is increased compared to that of the first embodiment, it is still possible to supply electric power to the chiller motors with the fewer variable speed drivers than in the comparative embodiment as is the case with the first embodiment.

Although the present invention has been described based on specific embodiments, these embodiments are merely exemplary and are not intended to limit the scope of the present invention. For example, in a natural gas liquefaction plant to which the gas turbine inlet air cooling system of the present invention can be applied, a usable liquefaction process is not limited to the C3-MR process, but may be any of other known processes such as a cascade process in which refrigeration cycles are individually formed by respective different refrigerants having different boiling points (methane, ethane, propane, or the like), a DMR (Double Mixed Refrigerant) process in which a mixed refrigerant such as a mixture of ethane and propane is used for pre-cooling, and a MFC (Mixed Fluid Cascade) process in which heat exchange is performed in stages for the processes of pre-cooling, liquefaction, and supercooling with the use of respective different mixed refrigerants. In addition, the number of gas turbines in a gas turbine inlet air cooling system of the present invention may be changed as appropriate. The number or use of refrigerant compressors to which the respective gas turbines supply powers may also be changed as appropriate. For example, a gas turbine inlet air cooling system of the present invention may be configured such that each refrigerant compressor is driven by a corresponding single gas turbine.

Glossary

1 gas turbine inlet air cooling system
2 refrigerant compressor (propane refrigerant compressor)
3 refrigerant compressor (mixed refrigerant compressor)
4 gas turbine
11 inlet air cooler
12 chiller
13 electric generator/gas turbine starting motor (starter motor)
14 variable speed driver (first variable speed driver)
21 chiller compressor
22 condenser
23 expansion valve
24 evaporator
26 chiller compressor motor
26 motor
30 circulation line
31 circulation line
32 cooling fluid pump (first pump)
33 pump motor (first pump motor)
33 chiller motor
33 motor
35 high-voltage main power line
36 circuit breaker
37 transformer
41 convertor section
42*a* to 42*d* inverter section
45 transformer
50 circulation line
51 blower
52 cooling tower
53 blower motor
54 coolant water pump (second pump)
55 pump motor (second pump motor)
61 variable speed driver (second variable speed driver)
101 inlet air cooling system
101 gas turbine inlet air cooling system
114*a* to 114*c* variable speed driver
135 low-voltage main power line

The invention claimed is:

1. An inlet air cooling system used in a gas turbine for supplying power to a refrigerant compressor for compressing refrigerant in a natural gas liquefaction plant, comprising:

an evaporator for cooling inlet air of the gas turbine by evaporative cooling;
a chiller for cooling coolant supplied to the evaporator by a refrigeration cycle, the chiller including one or more chiller motors;
a first variable speed driver for supplying electric power to each of the one or more chiller motors; and
an electric generator driven by the gas turbine,
wherein the electric generator is electrically connected to the first variable speed driver, and electric power generated by the electric generator is allowed to be supplied to each of the one or more chiller motors from the first variable speed driver without using a main power line of an electric power system,
wherein the electric generator functions as a starter motor for starting the gas turbine, and
wherein the gas turbine inlet air cooling system further comprises a second variable speed driver for supplying electric power from the main power line to the electric generator which functions as the starter motor.

2. The gas turbine inlet air cooling system according to claim 1, wherein at least part of the electric power generated by the electric generator is supplied from the second variable speed driver to the main power line.

3. The gas turbine inlet air cooling system according to claim 1, wherein at least part of the electric power generated by the electric generator is supplied from the first variable speed driver to the main power line.

4. The gas turbine inlet air cooling system according to claim 1, wherein the chiller motor comprises at least one selected from the group consisting of a chiller compressor motor for driving a chiller compressor used in the chiller; a first pump motor for driving a first pump for moving the coolant cooled by the chiller to the evaporator; and a second pump motor for driving a second pump for moving heating medium to a cooling tower, wherein heat exchange is performed between the heating medium and the coolant in a condenser used in the chiller.

5. The gas turbine inlet air cooling system according to claim 1, wherein the refrigerant compressor includes a propane compressor and a mixed refrigerant compressor for compressing propane refrigerant and a mixed refrigerant, respectively, for a C3-MR process used in the natural gas liquefaction plant.

6. An inlet air cooling method used in a gas turbine for supplying power to a refrigerant compressor for compressing refrigerant in a natural gas liquefaction plant, comprising:
an inlet air cooling step for cooling inlet air of the gas turbine by an evaporator;
a chilling step for cooling coolant used in the inlet air cooling step by a refrigeration cycle; and
a generating step for driving an electric generator by the gas turbine to generate electric power; and
an electric power supplying step in which electric power generated by the electric generator is supplied to one or more motors used in the chilling step from a first variable speed river without using a main power line of an electric power system,
wherein the electric generator functions as a starter motor for starting the gas turbine, and
wherein the gas turbine inlet air cooling system further comprises a second variable speed driver for supplying electric power from the main power line to the electric generator which functions as the starter motor.

* * * * *